(12) United States Patent
Aoki et al.

(10) Patent No.: US 9,247,214 B2
(45) Date of Patent: Jan. 26, 2016

(54) IMAGE PROCESSING APPARATUS AND IMAGE PROCESSING METHOD WITH PROJECTIVE TRANSFORM OF MULTIPLE CAMERAS

(71) Applicant: FUJITSU LIMITED, Kawasaki-shi, Kanagawa (JP)

(72) Inventors: Yasuhiro Aoki, Kawasaki (JP); Masami Mizutani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 278 days.

(21) Appl. No.: 14/050,918

(22) Filed: Oct. 10, 2013

(65) Prior Publication Data

US 2014/0139674 A1  May 22, 2014

(30) Foreign Application Priority Data

Nov. 21, 2012 (JP) ................................ 2012-255572

(51) Int. Cl.
*H04N 7/18* (2006.01)
*G06T 7/00* (2006.01)

(52) U.S. Cl.
CPC *H04N 7/18* (2013.01); *G06T 7/002* (2013.01); *G06T 2207/10021* (2013.01); *G06T 2207/30204* (2013.01); *G06T 2207/30252* (2013.01)

(58) Field of Classification Search
CPC ....................................................... H04N 7/18
USPC ....................................................... 348/148
See application file for complete search history.

(56) References Cited

U.S. PATENT DOCUMENTS

| | | |
|---|---|---|
| 2008/0231710 A1 | 9/2008 | Asari et al. |
| 2011/0115922 A1 | 5/2011 | Shimizu |
| 2011/0216194 A1 | 9/2011 | Kosaki |

FOREIGN PATENT DOCUMENTS

| | | |
|---|---|---|
| JP | 2007-150658 | 6/2007 |
| JP | 2008-187566 | 8/2008 |
| JP | 2011-107990 | 6/2011 |
| JP | 2011-182236 | 9/2011 |
| JP | 2011-217233 | 10/2011 |

*Primary Examiner* — Yulin Sun
(74) *Attorney, Agent, or Firm* — Fujitsu Patent Center

(57) ABSTRACT

An image processing apparatus includes an image obtaining section for obtaining images from cameras on a moving object; a correspondence processing section for generating a correspondence between characteristic points extracted from a pair of images before and after the moving object moves straight; a height/orientation estimating section for estimating orientations and heights of the cameras, by estimating a homography matrix from the corresponded characteristic points, then decomposing the homography matrix, and using the decomposition result, a movement direction vector, a road surface normal vector, and a moved amount of the moving object; a projective transform section for applying projective transform to common view parts between the cameras; and a relative position estimating section for estimating a relative position of one of the cameras relative to another one of the cameras using translation for overlapping the common view parts after projective transform.

6 Claims, 11 Drawing Sheets

TAKING IMAGE FOR THE FIRST TIME    TAKING IMAGE FOR THE SECOND TIME

TAKING IMAGE FOR
THE FIRST TIME

TAKING IMAGE FOR
THE SECOND TIME

IMAGE PROCESSING APPARATUS AND IMAGE PROCESSING METHOD WITH PROJECTIVE TRANSFORM OF MULTIPLE CAMERAS

CROSS-REFERENCE TO RELATED APPLICATIONS

This application is based upon and claims the benefit of priority of the prior Japanese Priority Application No. 2012-255572 filed on Nov. 21, 2012, the entire contents of which are hereby incorporated by reference.

FIELD

The disclosures herein relate to an image processing apparatus and an image processing method for processing captured images.

BACKGROUND

In recent years, a technology has been put to practical use that installs multiple cameras in a moving object such as a vehicle to provide captured images surrounding the vehicle for a driver or the like. For example, technologies such as a wrap-around view monitor are available. In an on-board multi-camera system, images surrounding a vehicle are provided by synthesizing images with multiple cameras. Also, in such an on-board multi-camera system, calibration of the installed cameras is executed to obtain high-quality synthesized images.

Here, calibration means to estimate the installed position of a camera relative to the vehicle (three degrees of freedom, for example, X, Y, and Z) and its orientation (three degrees of freedom, for example, tilt angle, roll angle, and pan angle).

As a calibration method, for example, a marker is installed at a known position surrounding a vehicle to estimate the position and orientation of a camera using a relationship between the physical position of the marker and a position of the marker in a camera image. This method requires, however, a special-purpose environment (for example, a vehicle factory) to install a marker at a known position surrounding a vehicle. Therefore, it is difficult for a user to easily execute calibration of a camera within a short time.

Thereupon, a technology has been devised that makes it possible to execute calibration easily within a short time without requiring a strict installation of a marker. For example, with such a technology, calibration is executed with images that capture jigs placed at predetermined positions surrounding a vehicle so that image capturing ranges of multiple cameras are overlapping at the positions of the jigs. Each of the jigs has a marker which is applied with a known process with other markers (see, for example, Patent Document 1).

RELATED-ART DOCUMENTS

Patent Documents

[Patent Document 1] Japanese Laid-open Patent Publication No. 2011-107990.

However, it has been impossible with the conventional technologies to freely execute calibration at an arbitrary timing, for example, while a vehicle is moving, because specific markers in a special-purpose environment are required for which a user needs to go for calibration.

SUMMARY

According to an embodiment, an image processing apparatus includes an image obtaining section configured to obtain a plurality of images from a plurality of cameras installed on a moving object; a correspondence processing section configured to generate a correspondence between a plurality of characteristic points extracted from one of the images before a movement and another one of the images after the movement, the movement being a straight movement made by the moving object; a height/orientation estimating section configured to estimate an orientation and a height for each of the cameras, the estimation being executed by estimating a homography matrix from the corresponded characteristic points, decomposing the homography matrix, and using the decomposition result, a movement direction vector common to all the cameras, a road surface normal vector, and a moved amount of the moving object; a projective transform section configured to apply projective transform to common view parts between the cameras using the orientation and height for each of the cameras; and a relative position estimating section configured to estimate a relative position of one of the cameras relative to another one of the cameras using translation for overlapping the common view parts having the projective transform applied.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

DESCRIPTION OF EMBODIMENTS

In the following, embodiments will be described with reference to the drawings.

Embodiment

First, the configuration of a multi-camera system 1 installed on a moving object will be described according to an embodiment. The multi-camera system 1 can be applied to, for example, an on-board multi-camera system.

<Configuration>

Figure 1:
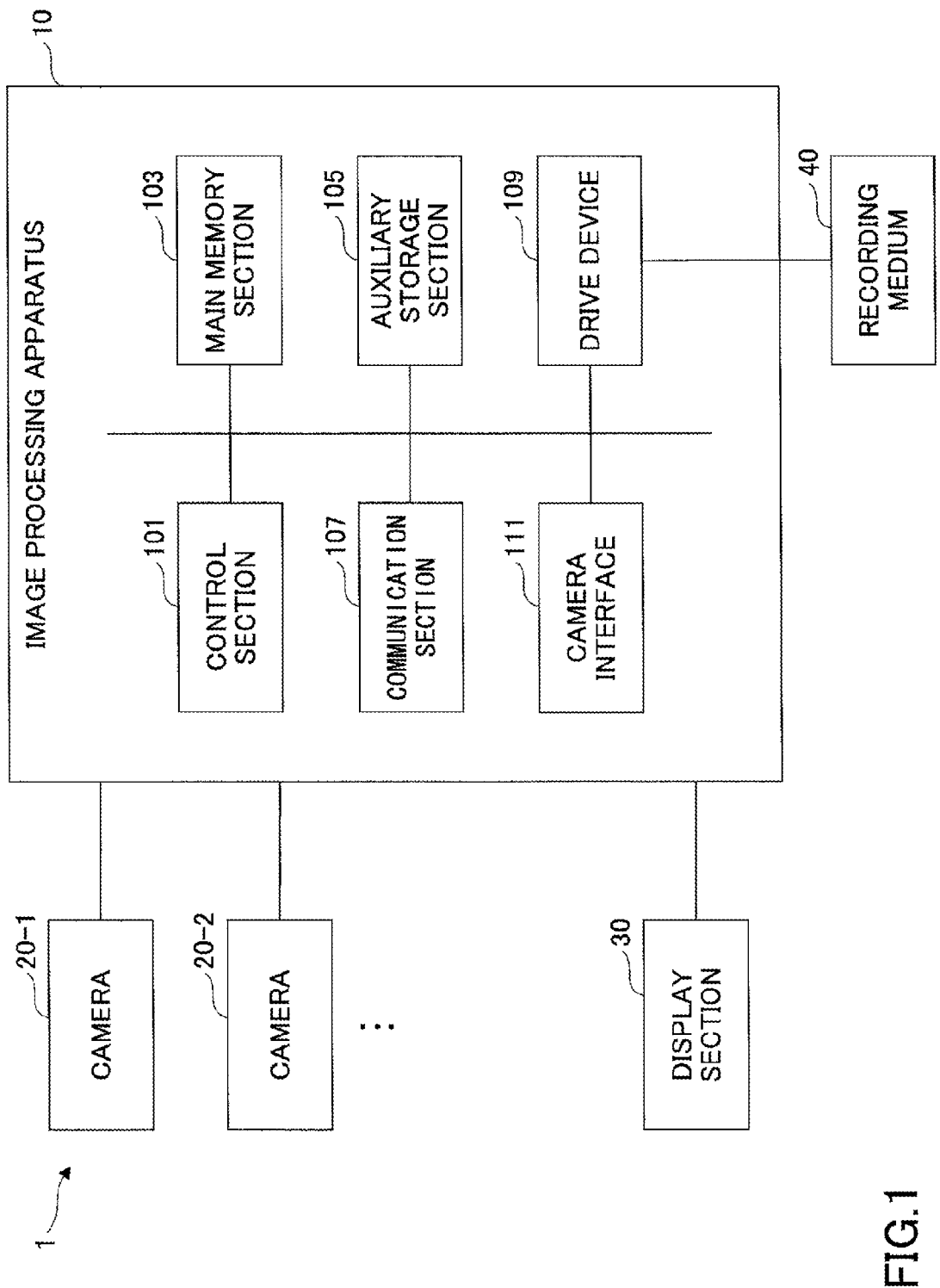
FIG. 1 is a block diagram illustrating an example of a configuration of a multi-camera system according to an embodiment.

FIG. 1 is a block diagram illustrating an example of a configuration of a multi-camera system 1 according to the present embodiment. The multi-camera system 1 includes an image processing apparatus 10, cameras 20, and a display section 30. The multi-camera system 1 includes multiple cameras (camera 20-1, camera 20-2, etc.). The cameras may be simply denoted as the "cameras 20" when there is no need to distinguish them from each other.

The image processing apparatus 10 obtains images from the multiple cameras 20 installed on a moving object, synthesizes these images, and generates an overlooking image or the like. Here, the image processing apparatus 10 executes calibration of the cameras 20 at an arbitrary timing. Details of calibration will be described later.

The image processing apparatus 10 also includes a control section 101, a main memory section 103, an auxiliary storage section 105, a communication section 107, a drive device 109, and a camera I/F 111. These sections are mutually connected via a data bus for data communication.

The control section 101 is a CPU (Central Processing Unit) to execute control of devices and calculation and processing of data in a computer. The control section 101 is also a processing device to execute a program stored in the main memory section 103 and the auxiliary storage section 105, to receive data from the input devices and storage devices, to calculate and process the data to output it to the output devices and storage devices. A program is, for example, a calibration program.

The main memory section 103 is, for example, a ROM (Read-Only Memory), a RAM (Random Access Memory) or the like, which is a storage device to store or to temporarily store an OS, or the basic software executed by the control section 101, programs such as application software or the like, and data.

The auxiliary storage section 105 is an HDD (Hard Disk Drive) or the like, which is a storage device to store data related to the application software and the like. The auxiliary storage section 105 stores, for example, images obtain by the cameras 20.

The communication section 107 executes wire or wireless data communication with peripheral devices. The communication section 107 obtains images, for example, via a network to store them into the auxiliary storage section 105.

The drive device 109 may read a calibration program to execute processing that will be described later from a recording medium 40, for example, a flexible disk or a CD (Compact Disc) to store it into the storage device.

Also, the recording medium 40 stores the calibration program that will be installed into the image processing apparatus 10 via the drive device 109. The installed calibration program can be executed by the image processing apparatus 10.

The camera I/F 111 is an interface to obtain images from the cameras 20. The camera I/F 111 stores obtained images into the auxiliary storage section 105, and outputs them to the control section 101.

The cameras 20 includes, for example, a front camera, a left camera, a right camera, and a back camera installed in a vehicle that capture images of a road surface to input them into the image processing apparatus 10 via the camera I/F 111.

The display section 30 displays output images generated by the image processing apparatus 10. For example, the display section 30 displays the overlooking image and the like.

<Functions>

Figure 2:
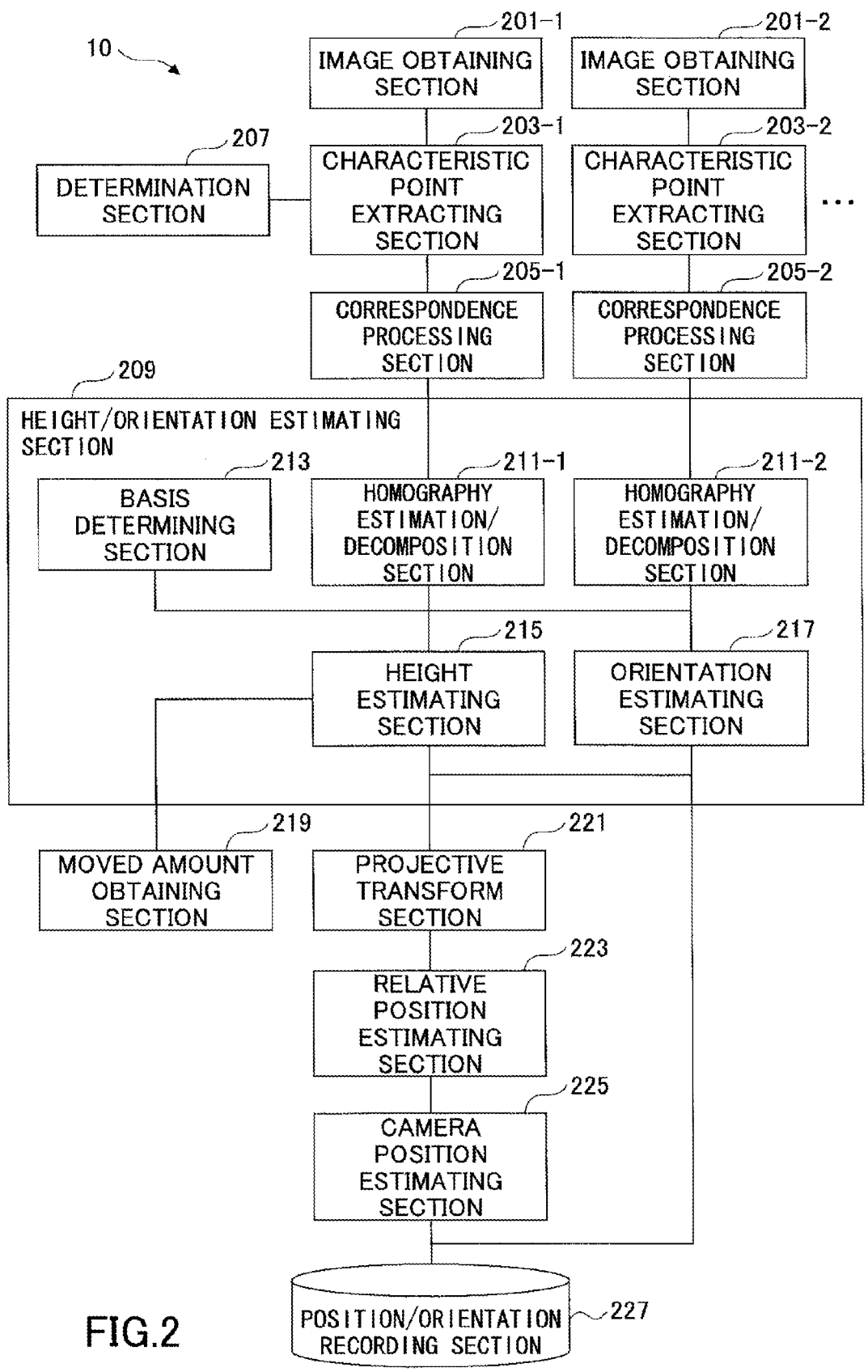
FIG. 2 is a block diagram illustrating an example of functions of an image processing apparatus according to an embodiment.

FIG. 2 is a block diagram illustrating an example of functions of the image processing apparatus 10 according to the present embodiment. The image processing apparatus 10 includes an image obtaining section 201, a characteristic point extracting section 203, a correspondence processing section 205, a determination section 207, a height/orientation estimating section 209, a moved amount obtaining section 219, a projective transform section 221, a relative position estimating section 223, a camera position estimating section 225, and a position/orientation recording section 227.

The height/orientation estimating section 209 includes a homography estimation/decomposition section 211, a basis determining section 213, a height estimating section 215, and an orientation estimating section 217.

Here, the number of the image obtaining sections 201, the characteristic point extracting sections 203, the correspondence processing sections 205, and the homography estimation/decomposition sections 211 are the same as the number of cameras 20. The same name sections have the same function, and only one of them will be described.

Sections other than the image obtaining section 201 and the position/orientation recording section 227 are, for example, functions that become executable when loaded into the main memory section 103 with an execution of the calibration program by the control section 101.

The image obtaining section 201 may be implemented, for example, by the camera I/F 111. The position/orientation recording section 227 may be implemented, for example, by the auxiliary storage section 105.

The image obtaining section 201 obtains images from the cameras 20 installed on a moving object. The image obtaining section 201 obtains images, for example, captured by the corresponding cameras 20. Correspondence relationships exist, for example, between the camera 20-1 and the image obtaining section 201-1, and between the camera 20-2 and the image obtaining section 201-2. The cameras capture images, for example, at least two times when the moving object makes a straight movement.

The characteristic point extracting section 203 extracts at least four characteristic points from an image when the image is captured. A characteristic point may be any point in an image provided that the point is on a road surface, and the same characteristic points are extracted from the two images captured by a camera. The characteristic point extracting section 203 may extract, for example, the center of a cover of a manhole, an endpoint of a white line, and the like, or may use a conventional technology such as SIFT (scale-invariant feature transform). The characteristic point extracting section 203 outputs the extracted characteristic points to the correspondence processing section 205.

The correspondence processing section 205 generates a correspondence between the characteristic points extracted by the characteristic point extracting section 203 included in images captured before and after a straight movement of a moving object. The correspondence processing section 205 generates a correspondence between the same characteristic points, for example, in two images captured by an arbitrary camera among the cameras 20.

The same characteristic points are detected in the two images, which is one of the conditions on characteristic points, to make it possible to generate a correspondence. For example, generation of a correspondence using SIFT can be implemented with conventional technologies.

Also, characteristic point detection and correspondence generation may use a publicly known object tracing technology. First, using a publicly known white line tracing technology, a white line is detected and traced at timings for image capturing. Next, the characteristic point extracting section 203 extracts, for example, an endpoint of the white line as a characteristic point. Also, the correspondence processing section 205 can generates a correspondence between the characteristic points because the same white line has been detected by tracing at the timings.

The determination section 207 determines whether the moving object makes a straight movement. For example, the determination section 207 may determine a straight movement with a gyro sensor mounted on the moving object. Alternatively, the determination section 207 may determine a straight movement if a movement vectors representing movement of one or more characteristic points in at least two images captured by the front camera indicates a forward movement or a backward movement in the moving direction. If determining a straight movement, the determination section 207 may issue a command to proceed to operations after the characteristic point extracting section 203.

This makes it possible to execute calibration automatically while the moving object is running.

Next, operations of the height/orientation estimating section 209 will be described. In the following, for describing the height/orientation estimating section 209, an on-board multi-camera system is taken as an example that has four on-board cameras 20 attached at the front (F camera), back (B camera), left side (L camera), and right side (R camera) of a vehicle. Also in the following, a vehicle is taken as an example of a moving object.

The height/orientation estimating section 209 estimates a homography matrix from corresponded characteristic points, and estimates orientations and heights of the cameras 20 installed on the moving object using a decomposition result, a movement direction vector common to all the cameras, a road surface normal vector, and a moved amount of the moving object.

Here, the cameras 20 are attached to the vehicle with a bit of a downward angle to capture images of the road surface. Also, coordinate systems are assumed to be right-hand systems, the vehicle coordinate system has its origin at the center of the moving object, the forward movement direction of the moving object is taken as the positive direction of the y-axis, and the vertical upward direction is taken as the positive direction of the z-axis. The right direction of the moving object is the positive direction of the x-axis because it is a right-hand system.

Also, the road surface is taken as the X-Y plane with Z=0. Also, in the camera coordinate system, the optical axis is taken as the z-axis, a camera captures images in the negative direction of the z-axis, and the upward direction of the camera is taken as the positive direction of the y-axis. The right direction of the camera is the positive direction of x-axis because it is a right-hand system. These are examples for description, which do not mean to limit other implementations.

Internal parameters of a camera C (C is one of F (front), B (back), L (left), or R (right) camera) are assumed to be known. In the following, a camera 20 may also be denoted as a camera C. The internal parameters include a focal distance, lens distortion, and the like, which may be represented by design values, or may be estimated beforehand using a publicly known internal parameter estimation method.

Image coordinate values of the i-th characteristic point on the road surface when captured by a camera C at a timing t (t=1, 2) will be denoted as $P^C_{i,t}$. Here, it is assumed that there is a correspondence between $P^C_{i,1}$ and $P^C_{i,2}$. A direction vector, denoted as $v^C_{i,t}$, directing towards the characteristic point viewed from the camera C can be obtained from the image coordinate values with a publicly known method because the internal parameters are known. Also, a projection of the direction vector onto an image surface z=1 will be denoted as $u^C_{i,t}$. Namely, assuming that $v^C_{i,t}$ is represented by Formula (1), a relationship between the direction vector and its projection is represented by Formula (2).

$$v^C_{i,t} = [x, y, z]'  \quad\quad \text{Formula (1)}$$

$$u^C_{i,t} = \frac{v^C_{i,t}}{z} = \left[\frac{x}{z}, \frac{y}{z}, 1\right]' \quad\quad \text{Formula (2)}$$

Characteristic points exist on the road surface (the same plane). Therefore, a homography matrix $H_c$ that transforms the projection at the first time into the projection at the second time is represented by Formula (3).

$$u^C_{i,2} \propto H_C u^C_{i,1}  \quad\quad \text{Formula (3)}$$

Here, a symbol ∝ denotes equivalence irrespective of constant factors. A homography matrix can be estimated using a publicly known method if there are more than three corresponding characteristic points.

Also, it is publicly known that a homography matrix is represented by Formula (4).

$$H_C = R_C + \frac{t_C n'_C}{d_C} \quad\quad \text{Formula (4)}$$

where $R_C$ denotes a camera orientation when capturing an image for the second time, represented in the camera coordinate system when capturing the image for the first time. $t_C$ denotes a camera position (destination of the camera movement) when capturing an image for the second time, represented in the camera coordinate system when capturing the image for the first time.

Also, $n_C$ denotes the normal vector of the plane (road surface) where characteristic points are obtained, represented in the camera coordinate system when capturing the image for the first time. $d_C$ denotes a distance between the plane where the characteristic points are obtained and the camera.

Figure 3:
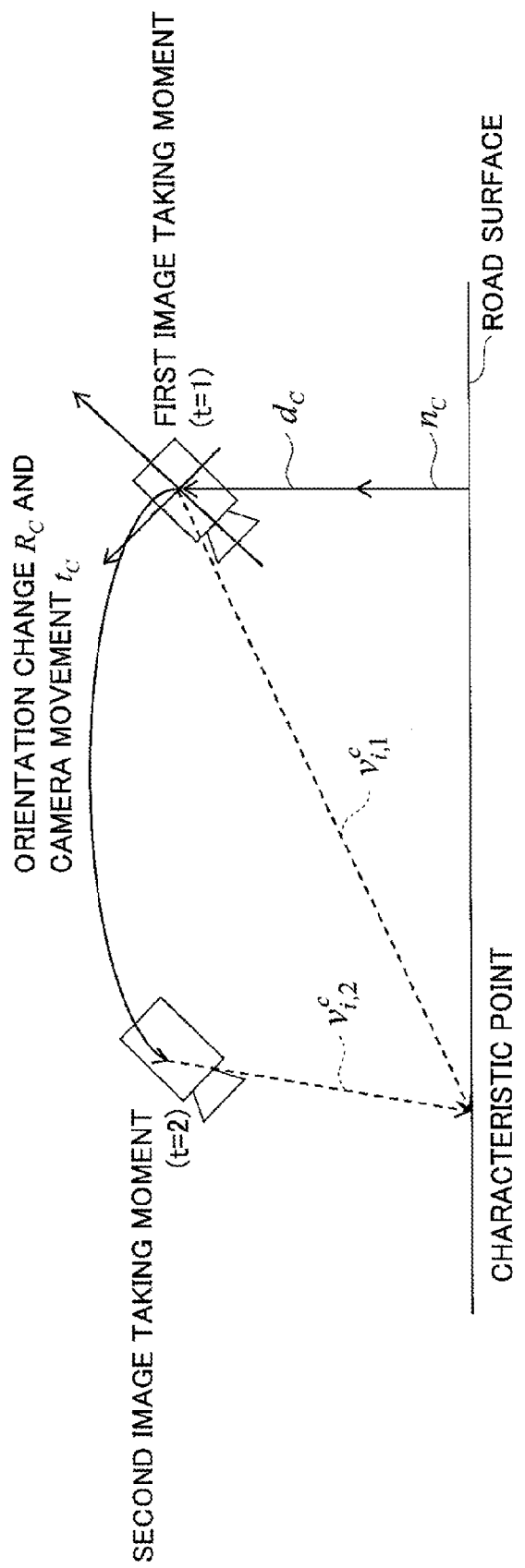
FIG. 3 is a schematic view illustrating parameters relevant to a movement of a camera.

A relationship among the parameters are illustrated in FIG. 3. FIG. 3 is a schematic view illustrating parameters relevant to a movement of a camera. In an example illustrated in FIG. 3, the direction towards a characteristic point is changed between direction vectors $v^C_{i,t}$ with a movement of a camera. A normal vector $n_C$ and a distance $d_C$ are as illustrated in FIG. 3. A camera orientation after the movement of the camera is $R_C$ and the destination of the camera movement is $t_C$.

Here, Formula (4) can be transformed into Formula (7) using Formula (5) and Formula (6), with which the following publicly known fact becomes apparent.

$$T_C = \frac{t_C}{d_C} \quad\quad \text{Formula (5)}$$

$$s_C = R'_C T_C \quad\quad \text{Formula (6)}$$

$$H_C = R_C(I + s_C n'_C) \quad\quad \text{Formula (7)}$$

Namely, a decomposition method exists that obtains a pair of $(s_C, n_C)$ from $H_C$. Decomposition can be done in four ways mathematically. However, two decomposition results are obtained as candidate solutions in the way the camera optical axis is set. This leaves ambiguity that which of the two is the true solution. Here, Rc can be calculated by Formula (8) using $(s_C, n_C)$ in Formula (7).

$$R_C = H_C(I + s_C n'_C)^{-1} \quad \text{Formula (8)}$$

Referring to FIG. 2 again, the homography estimation/decomposition section 211, first estimates a homography matrix and calculates two decompositions from the characteristic points obtained with characteristic point detection and correspondence generation using the above publicly known method, to calculate two sets of $(s_C, n_C, R_C)$.

Here, in the present embodiment, it is assumed that the second image is captured when the vehicle has made a straight movement (including a forward movement or a backward movement) in the vehicle moving direction after the first time image capturing. This means that the relative orientation of the camera remains unchanged between the two times of image capturing; hence the true solution of $R_C$ is a unit matrix. Therefore, one of the two sets of $(s_C, n_C, R_C)$ is inferred as the true solution that includes Rc closer to the unit matrix.

Therefore, the homography estimation/decomposition section 211, next, calculates the error differences between $R_C$'s and the unit matrix to select the solution that has a smaller error difference. The error difference may be obtained with, for example, the Frobenius norm. The homography estimation/decomposition section 211 sets the selected set as the final $(s_C, n_C, R_C)$.

Next, the homography estimation/decomposition section 211 obtains $T_C$ from $s_C$ and $R_C$ by Formula (9), to output $(n_C, T_C)$.

$$T_C = R_C s_C \quad \text{Formula (9)}$$

The basis determining section 213 determines a direction vector directing in a straight movement direction of the vehicle in the vehicle coordinate system, and a road surface normal vector in the vehicle coordinate system. In the present embodiment, the movement direction of a straight movement directs towards the positive direction along the y-axis because the moving direction of the vehicle is taken as the y-axis, and a forward movement of a vehicle means a movement in the moving direction. Similarly, the road surface normal directs towards the positive direction along the z-axis because the road surface is regarded as the X-Y plane.

The orientation estimating section 217 estimates the orientation of an installed camera relative to the vehicle, calculates a rotation matrix, for example, by giving the movement direction vector and road surface normal vector determined by the basis determining section 213 to the solution selected by the homography estimation/decomposition section 211. The rotation matrix corresponds to the orientation of the camera.

First, $n_C$ is the normal vector of the road surface in the camera coordinate system. As described above, the normal vector of the road surface directs towards, for example, the positive direction along the z-axis in the vehicle coordinate system. Also, $T_C$ directs in the same direction as $t_C$ by Formula (5), which is the movement direction in the camera coordinate system because $t_C$ is the destination of the camera movement between the two times of image capturing.

In addition, as determined at the basis determining section 213, the movement direction directs towards, for example, the straight movement direction of the vehicle, which is the positive direction along the y-axis in the vehicle coordinate system. Therefore, the orientation estimating section 217 can calculate the rotation matrix corresponding to the orientations of the cameras installed on the vehicle using the road surface normal and the movement direction that are common to all the cameras.

A rotation matrix is calculated by Formula (10).

$$^{Car}R_C = \left[ \frac{T_C}{\|T_C\|} \times n_C, \frac{T_C}{\|T_C\|}, n_C \right]' \quad \text{Formula (10)}$$

Although the orientation estimating section 217 may use the obtained rotation matrix as orientation data, it may be converted into an Eulerian angle representation with a tilt angle, a roll angle, and a pan angle. The conversion from a rotation matrix into Eulerian angles is publicly known.

The height estimating section 215 estimates the height of a camera using the solution selected by the homography estimation/decomposition section 211 and the moved amount of the vehicle. The height estimating section 215 estimates the height $^{Car}Z_C$ of the camera, for example, using $T_C$ obtained from the selected solution and the straight moved amount obtained by the moved amount obtaining section 219. The height of a camera represents the distance between the road surface and the camera, which is equivalent to $d_C$ in Formula (5).

Here, denoting the obtained straight movement amount as $Y_{Car}$, the following Formula (11) holds because the straight movement is also represented with $t_C$.

$$Y_{Car} = \|t_C\| \quad \text{Formula (11)}$$

Therefore, the height estimating section 215 can calculate $^{Car}Z_C$ by Formula (12).

$$^{Car}Z_C = d_C = \frac{\|t_C\|}{\|T_C\|} = \frac{Y_{Car}}{\|T_C\|} \quad \text{Formula (12)}$$

As described above, the orientations and heights of the cameras are estimated with the orientation estimating section 217 and the height estimating section 215.

The moved amount estimate section 219 estimates the moved amount of the vehicle, to output it to the height estimating section 215. A moved amount of the vehicle may be obtained, for example, using a speed counter.

Next, a relative position relationship among the cameras is obtained. Here, obtaining a relative position relationship means, for example, obtaining (X, Y) translation of L camera relative to the position of F camera as a reference.

In the present embodiment, a relative position relationship needs to be obtained only for (X, Y) translation because the orientations and heights of the cameras are estimated in the vehicle coordinate system when obtaining the relative position relationship among the cameras. This process is executed by the projective transform section 221 and the relative position estimating section 223, which will be described below.

The projective transform section 221 applies projective transform to common view parts among the cameras using the orientations and heights obtained by the height/orientation estimating section 209. The relative position estimating section 223 estimates the relative position of one of the cameras relative to the other camera by applying translation so that the common view parts are overlapped.

In the following, an example is taken for explanation where (X, Y) translation of L camera is obtained relative to the position of F camera as a reference. Here, substantially the same process may be applied to obtain translation of R camera relative to F camera as a reference, or translation of B camera relative to L camera as a reference. Also, translation of B camera relative to F camera as a reference can be obtained from translation of L camera relative to F camera as a reference and translation of B camera relative to L camera as a reference. Therefore, translation of each of the cameras relative to F camera as a reference can be obtained.

Relative position estimation is executed using one of the two captured images. Alternatively, a third captured image may be used. A relative position to be obtained for L camera relative to F camera will be denoted as (XL,YL). Forthrightly, relative position estimation is to obtain a translation (XL,YL) so that the common view parts between the cameras are overlapped, which will be described in detail in the following.

First, the projective transform section 221 reuses the above characteristic point extraction and correspondence generation to extract at least one characteristic point on the road surface in the common views of F camera and L camera. Namely, the projective transform section 221 extracts characteristic points on the road surface in F camera image and L camera image by characteristic point extraction, and generates one or more correspondences between the characteristic points captured both in F camera image and in L camera image among the extracted characteristic points by correspond generation.

If a correspondence between characteristic points is generated, the projective transform section 221 calculates direction vectors $v^F_M$ and $v^L_M$ to the corresponded characteristic point from F camera and L camera, respectively.

Next, the projective transform section 221 calculates coordinate values $(X^C_M, Y^C_M)$ of the characteristic point on the road surface relative to the positions immediately below the cameras as references. The coordinate values on the road surface are calculated by Formula (13).

$$\begin{bmatrix} X^C_M \\ Y^C_M \\ 0 \end{bmatrix} = k^C_M {}^{Car}R_C v^C_M + \begin{bmatrix} 0 \\ 0 \\ {}^{Car}Z_C \end{bmatrix} \quad \text{Formula (13)}$$

$k^C_M$ on the right-hand side of Formula (13) is an unknown quantity. However, Formula (13) is simultaneous equations in three unknowns, which can be solved. Calculated results for F and L cameras will be denoted as $(X^F_M, Y^F_M)$ and $(X^L_M, Y^L_M)$, respectively. The projective transform section 221 outputs the obtained calculation result to the relative position estimating section 223.

The relative position estimating section 223 obtains a relative position of L camera with respect to F camera. When obtaining the relative position, it takes an advantage of the fact that the calculated result of coordinate values obtained by the projective transform section 221, $(X^F_M, Y^F_M)$ and $(X^L_M, Y^L_M)$ are obtained from the corresponded characteristic points that are located on the same physical position.

Namely, the difference between $(X^F_M, Y^F_M)$ and $(X^L_M, Y^L_M)$ is the relative translation amount between the cameras. This is represented by Formula (14).

$$\begin{bmatrix} X^F_M \\ Y^F_M \\ 0 \end{bmatrix} = k^L_M {}^{Car}R_L v^L_M + \begin{bmatrix} 0 \\ 0 \\ {}^{Car}Z_L \end{bmatrix} + \begin{bmatrix} XL \\ YL \\ 0 \end{bmatrix} = \begin{bmatrix} X^L_M \\ Y^L_M \\ 0 \end{bmatrix} + \begin{bmatrix} XL \\ YL \\ 0 \end{bmatrix} \quad \text{Formula (14)}$$

The relative position estimating section 223 can obtain the relative position (XL, YL) by Formula (15), which is derived from Formula (14).

$$\begin{bmatrix} XL \\ YL \end{bmatrix} = \begin{bmatrix} X^F_M \\ Y^F_M \end{bmatrix} - \begin{bmatrix} X^L_M \\ Y^L_M \end{bmatrix} \quad \text{Formula (15)}$$

If more than one correspondence between characteristic points are generated, Formula (15) is obtained for each of the correspondences; hence, for example, the relative position estimating section 223 may set the relative position (XL, YL) to the average value.

Also, the image processing apparatus 10 may not execute characteristic point extraction, but treats a whole image as a characteristic. In this case, the projective transform section 221 generates a projection image onto the road surface by Formula (13). The relative position estimating section 223 estimates a relative position (XL, YL) with respect to an overlapping degree of common view parts using, for example, SAD value as a reference for optimization.

With the above procedure, the relative position (XL, YL) of L camera can be estimated relative to F camera as a reference. Also as described above, the relative position (XB, YB) of B camera relative to F camera as a reference can be obtained with substantially the same procedure, as well as the relative position (XR, YR) of R camera. Here, it is assumed that (XF, YF)=(0, 0).

The camera position estimating section 225 obtains the position (X, Y) in the vehicle coordinate system based on the relative position obtained by the relative position estimating section 223. The camera position estimating section 225 obtains the result in the following way, based on the origin of the vehicle coordinate system located at the center of the vehicle.

First, the camera position estimating section 225 calculates the center position of the vehicle $(X_0, Y_0)$ using Formula (16) and Formula (17).

$$X_0 = \frac{XL + XR}{2} \quad \text{Formula (16)}$$

$$Y_0 = \frac{YF + YB}{2} \quad \text{Formula (17)}$$

Next, the camera position estimating section 225 calculates coordinate values of $({}^{Car}X_C, {}^{Car}Y_C)$ in the vehicle coordinate system for each of the cameras C using Formula (18) and Formula (19) with setting the center of the vehicle at the origin.

$${}^{Car}X_C = X_C - X_0 \quad \text{Formula (18)}$$

$${}^{Car}Y_C = Y_C - Y_0 \quad \text{Formula (19)}$$

The position/orientation recording section 227 records the position $({}^{Car}X_C, {}^{Car}Y_C)$ for each of the cameras C in the vehicle coordinate system calculated by the camera position estimating section 225, and the orientation ${}^{Car}R_C$ for each of the cameras C calculated by the orientation estimating section 217. Calibration is completed with the above procedure.

Concrete Example

Next, with reference to FIGS. 4-7, an example will be described in which a vehicle executes calibration by extracting characteristic points on the road surface, for example, endpoints of a white line. According to the present embodiment, special markers are not required because characteristic points on the road surface are used.

Figure 4:
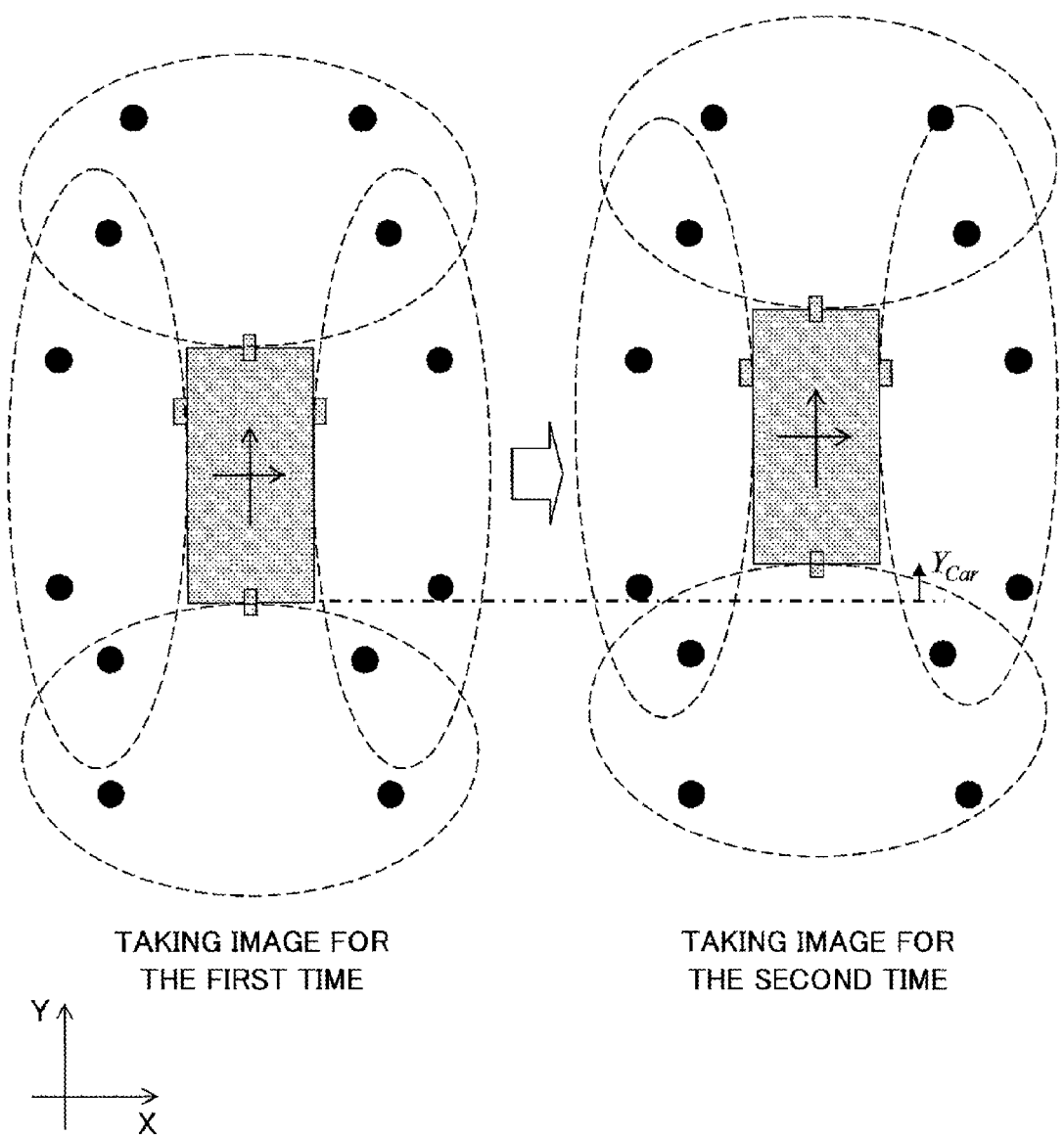
FIG. 4 is a schematic view illustrating an example of calibration executed based on four characteristic points.

FIG. 4 is a schematic view illustrating an example of calibration executed based on four characteristic points. Dotted ovals illustrated in FIG. 4 indicate image capturing ranges of the cameras C. Black dots illustrated in FIG. 4 represent characteristic points. As illustrated in FIG. 4, there exist four characteristic points in each of the image capturing ranges of the cameras C. Also as illustrated in FIG. 4, the vehicle makes a forward movement in the Y direction (moving direction) between the first image capturing moment and the second image capturing moment. According to the present embodiment, the vehicle executes calibration when making a straight movement.

Also, the size and shape of a characteristic point are not restricted. The cameras can be installed with no restrictions on coordinate values. However, there is a condition that characteristic points need to be corresponded between two captured images.

Figure 5:
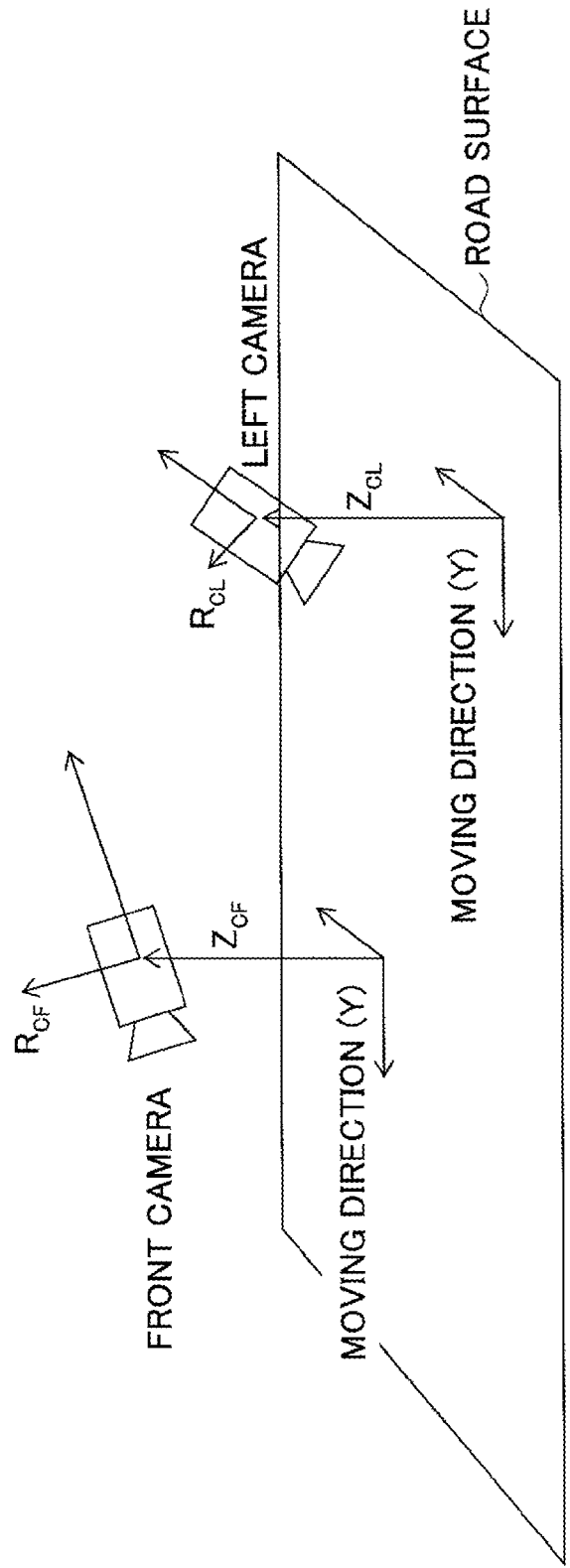
FIG. 5 is a schematic view illustrating a relationship among a front camera, a left camera, and parameters.

FIG. 5 is a schematic view illustrating a relationship among a front camera, a left camera, and parameters. In FIG. 5, although only front and left cameras are illustrated for the sake of simplicity, right and back cameras may be installed on an actual vehicle.

After correspondence generation of characteristic points, the homography estimation/decomposition section 211 obtains a homography matrix, and decomposes the matrix to obtain ($n_C$, $T_C$). Using the obtained ($n_C$, $T_C$) for each of the cameras, $R_{CF}$ and $R_{CL}$ are obtained that correspond to the orientation for each of the cameras.

Here, the height ZC of an installed camera may be measured beforehand. Alternatively, if the moved amount of the vehicle can be obtained with an odometer or the like, the height estimating section 215 may estimate the height $Z_{CF}$ and $Z_{CL}$ of the cameras, respectively, using the moved amount.

Figure 6:
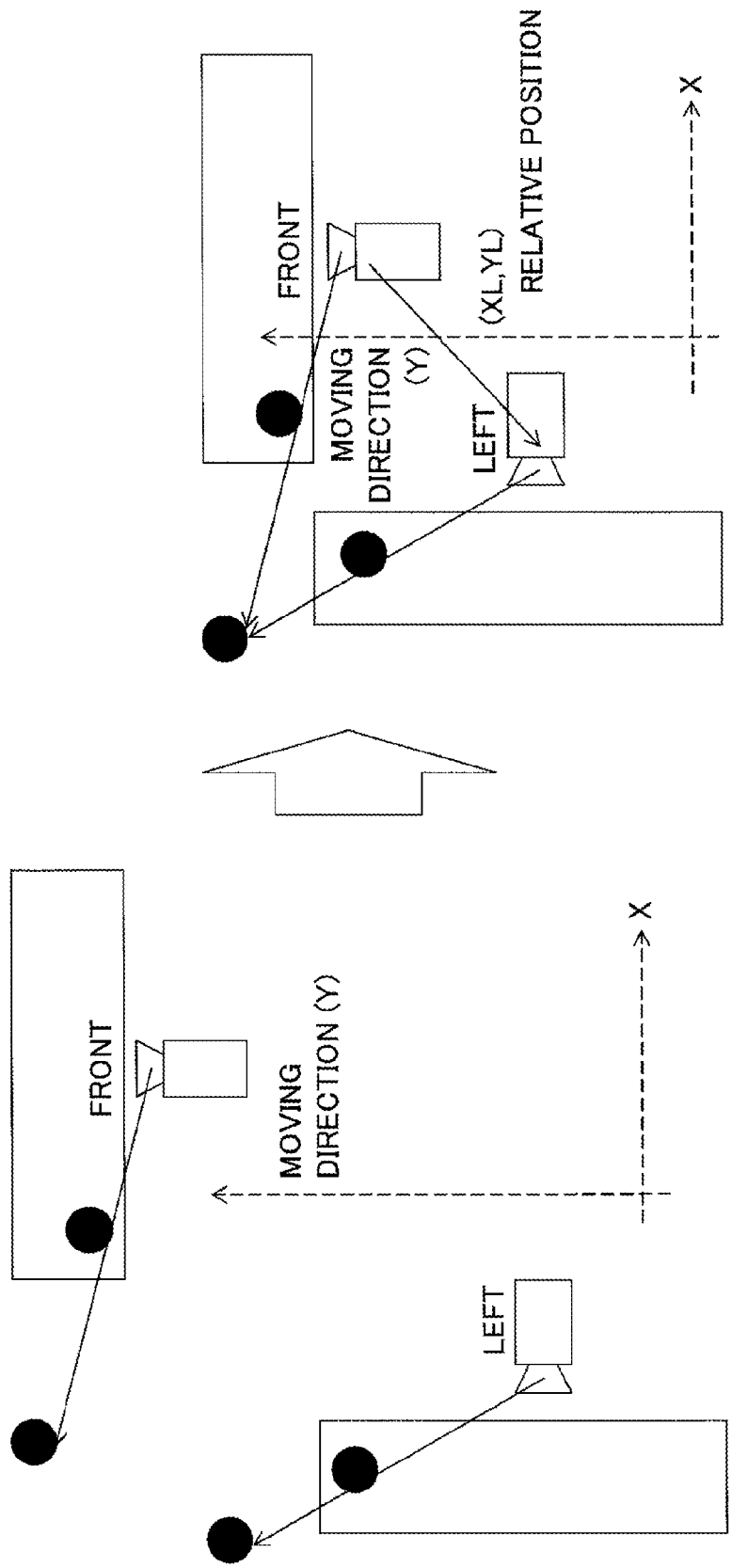
FIG. 6 is a schematic view illustrating a procedure for obtaining relative positions of cameras.

FIG. 6 is a schematic view illustrating a procedure for obtaining relative positions of the cameras. In an example illustrated in FIG. 6, the relative position (XL, YL) of the left camera is obtained relative to the front camera. If there is a characteristic point in a common view, the relative position (XL, YL) can be estimated by re-projecting (projective transform) it on the road surface to make the characteristic points be overlapped across common views. Here, relative pan angles are not required because the moving direction is common among the cameras in this example. The image processing apparatus 10 can obtain all relative positions of the cameras (back, left, and right) relative to the front camera with substantially the same procedure.

Figure 7:
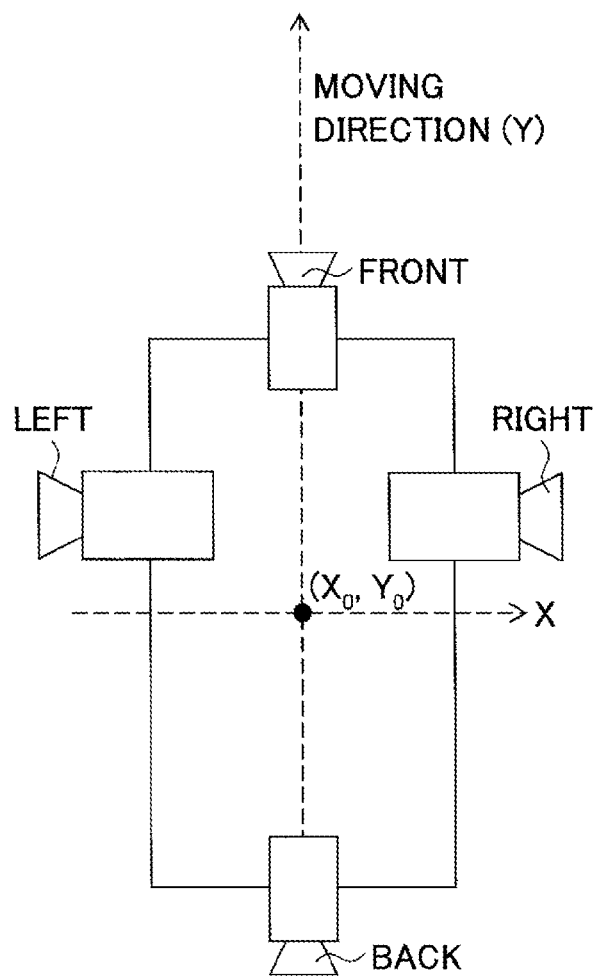
FIG. 7 is a schematic view illustrating an origin of a vehicle coordinate system.

FIG. 7 is a schematic view illustrating an origin of a vehicle coordinate system. As illustrated in FIG. 7, the camera position estimating section 225 sets the Y coordinate value of the middle point between the front camera and back camera to $Y_0$, the X coordinate value of the middle point between the left camera and right camera to $X_0$, and set the point ($X_0$, $Y_0$) as the origin of the vehicle coordinate system.

The camera position estimating section 225 applies translation to the coordinate values of relative positions of the cameras so that ($X_0$, $Y_0$) becomes the origin of the vehicle coordinate system. The position/orientation recording section 227 stores the positions and orientations of the cameras obtained with the above procedure as a calibration result.

In this way, the image processing apparatus 10 can execute calibration while the vehicle is moving by extracting, tracing, and using characteristic points on the road. Also, the image processing apparatus 10 may trace a white line on the road to use endpoints of the white line as characteristic points.

<Operations>

Next, operations of the image processing apparatus 10 will be described according to the present embodiment. First, correspondence generation of characteristic points will be described.

<<Correspondence Generation of Characteristic Points>>

Figure 8:
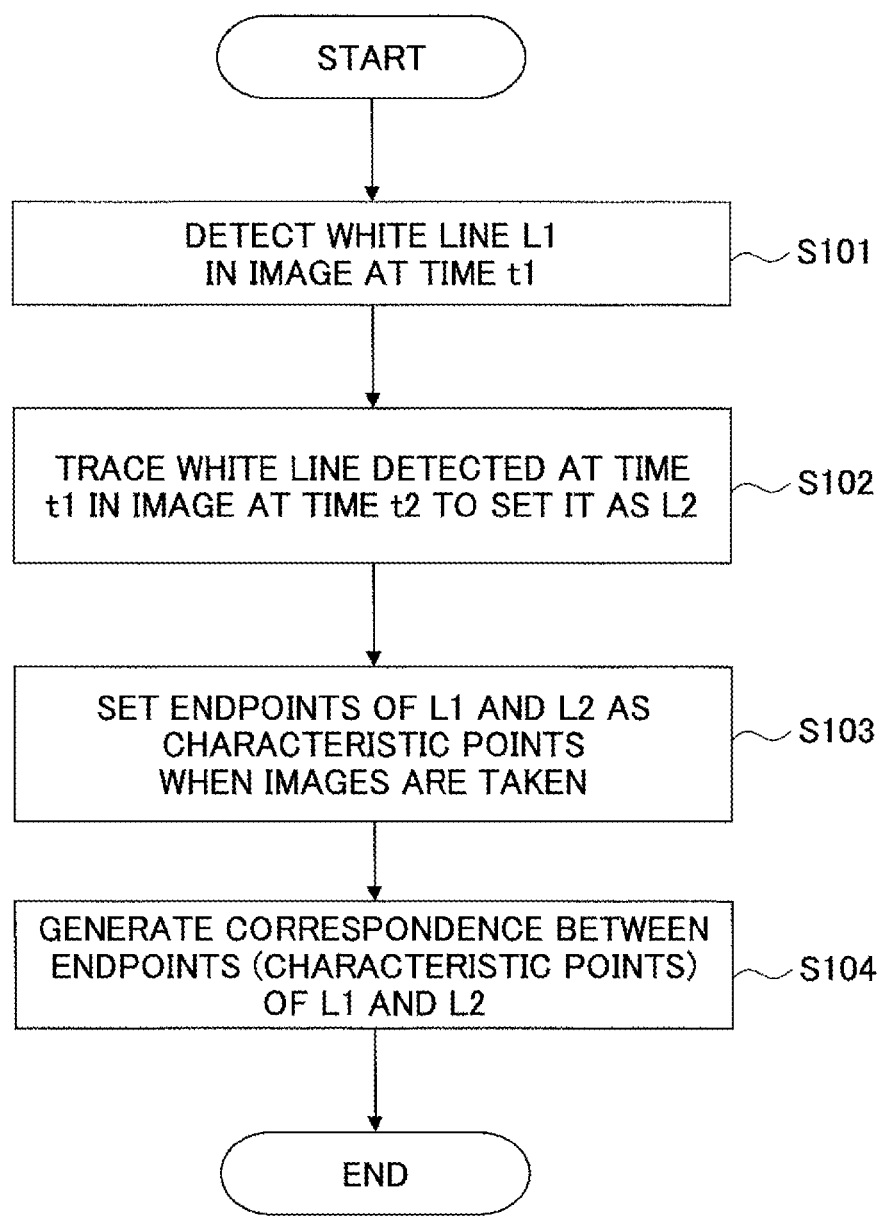
FIG. 8 is a flowchart illustrating an example of a procedure for generating a correspondence between characteristic points according to an embodiment.

FIG. 8 is a flowchart illustrating an example of a procedure for generating correspondence between characteristic points according to the present embodiment. In an example illustrated in FIG. 8, although endpoints of a white line are used as characteristic points, implementations are not limited to the example. At Step S101 illustrated in FIG. 8, the characteristic point extracting section 203 detects a white line L1 in an image captured at time t1.

At Step S102, the characteristic point extracting section 203 traces the white line detected at time t1 in an image captured at time t2, which is referred to as L2.

At Step S103, the characteristic point extracting section 203 extracts endpoints of L1 and L2 as the characteristic points of the captured images, respectively.

At Step S104, the correspondence processing section 205 generates a correspondence between the endpoints (characteristic points) of L1 and L2.

<<Homography Calculation Procedure>>

Figure 9:
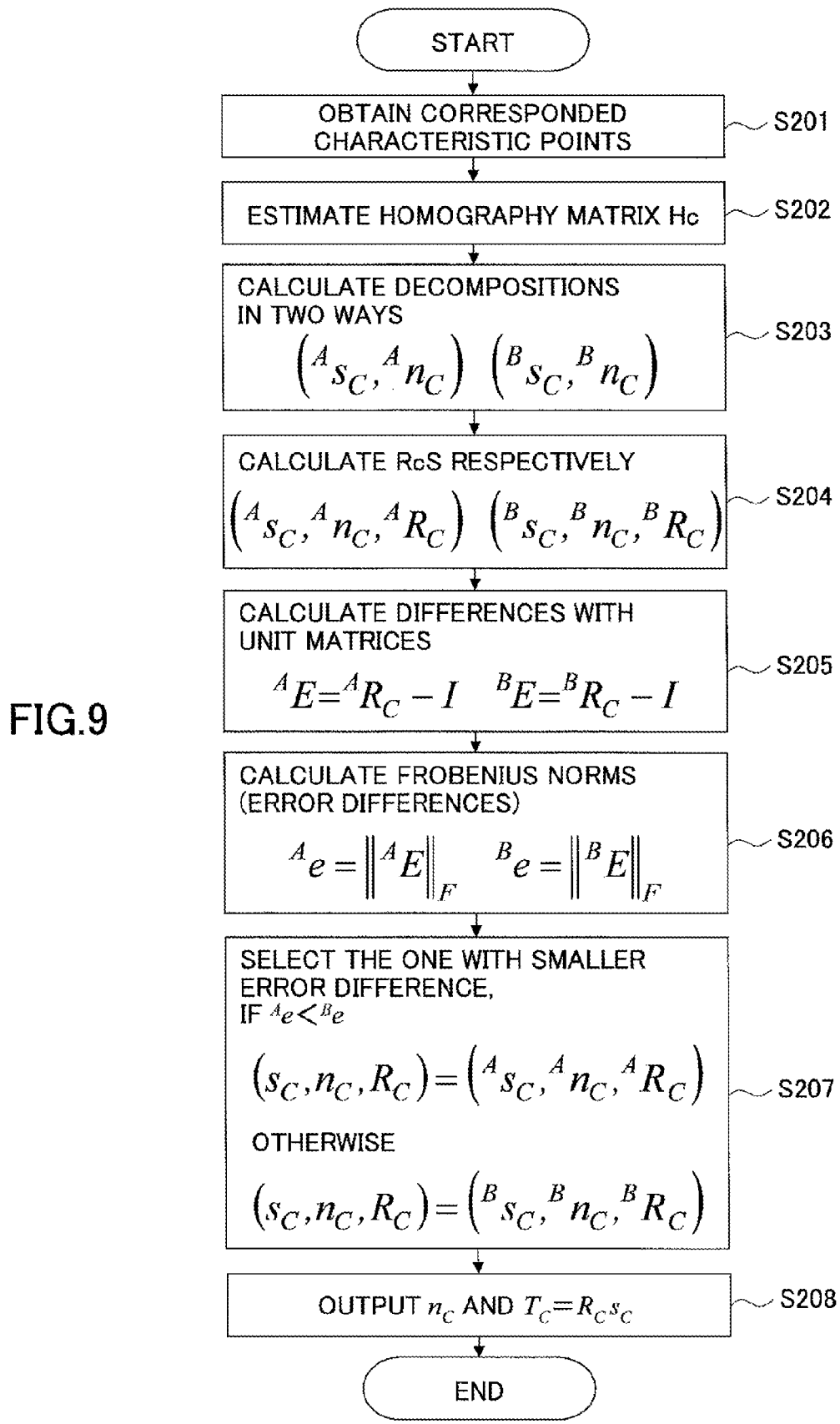
FIG. 9 is a schematic view illustrating an example of a homography calculation procedure according to an embodiment.

FIG. 9 is a schematic view illustrating an example of the homography calculation procedure according to the present embodiment. At Step S201 illustrated in FIG. 9, the homography estimation/decomposition section 211 obtains the corresponded characteristic points.

At Step S202, the homography estimation/decomposition section 211 estimates a homography matrix $H_c$.

At Step S203, the homography estimation/decomposition section 211 calculates two decompositions ($^A s_C$, $^A n_C$) and ($^B s_C$, $^B n_C$) from the estimated homography matrix $H_c$.

At Step S204, the homography estimation/decomposition section 211 calculates $R_C$'s of the two solutions, ($^A s_C$, $^A n_C$, $^A R_C$) and ($^B s_C$, $^B n_C$, $^B R_C$), respectively.

At Step S205, the homography estimation/decomposition section 211 calculates the differences between $R_C$'s and unit matrices, $^A E = {}^A R_C - I$ and $^B E = {}^B R_C - I$, respectively, where I denotes the unit matrix.

At Step S206, the homography estimation/decomposition section 211 calculates, for example, Frobenius norms (error differences), $^A e = \|^A E\|_F$ and $^B e = \|^B E\|_F$.

At Step S207, the homography estimation/decomposition section 211 selects the one with a smaller error difference. Namely, the one with a smaller error difference is ($s_C$, $n_C$, $R_C$)=($^A s_C$, $^A n_C$, $^A R_C$) if $^A e < {}^B e$, or ($s_C$, $n_C$, $R_C$)=($^B s_C$, $^B n_C$, $^B R_C$) if $^A e \geq {}^B e$.

At Step S208, the homography estimation/decomposition section 211 outputs the obtained $n_C$ and $T_C = R_C \times s_C$.

<<Height and Orientation Estimation Procedure>>

Figure 10:
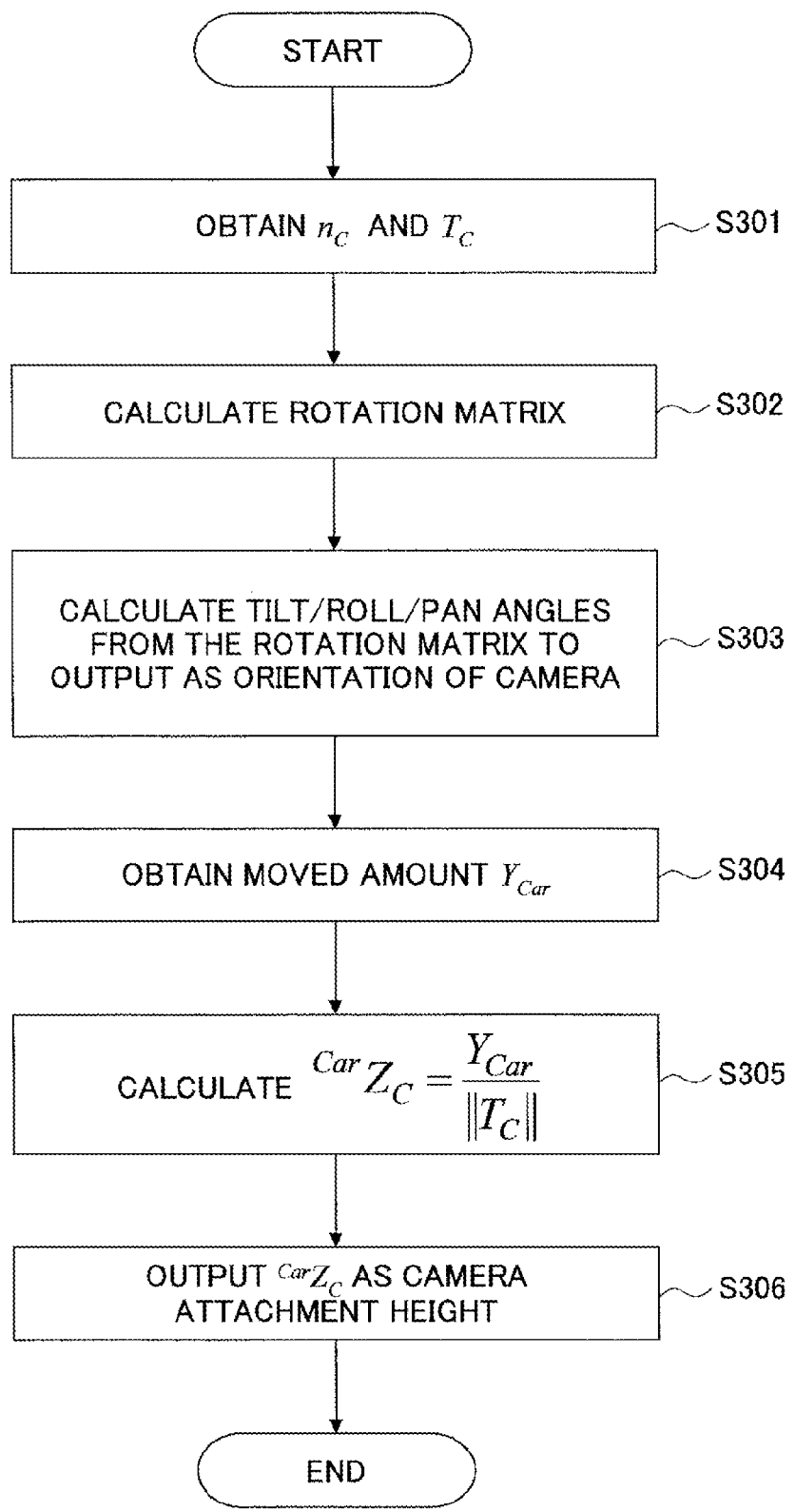
FIG. 10 is a flowchart illustrating an example of a procedure for estimating the height and orientation of a camera according to an embodiment.

FIG. 10 is a flowchart illustrating an example of a procedure for estimating the height and orientation of a camera according to the present embodiment. In the procedure illustrated in FIG. 10, although a tilt angle, a roll angle, and a pan angle are calculated to indicate an orientation of a camera, these are not necessarily required.

At Step S301 illustrated in FIG. 10, the orientation estimating section 217 obtains $n_C$ and $T_C$ calculated by the homography estimation/decomposition section 211.

At Step S302, the orientation estimating section 217 calculates a rotation matrix by Formula (10) using $n_C$ and $T_C$.

At Step S303, the orientation estimating section 217 calculates the tilt angle, roll angle, and pan angle from the rotation matrix, then outputs them as the orientation of the camera.

At Step S304, the height estimating section 215 obtains a moved amount $Y_{Car}$ of the vehicle from the moved amount obtaining section 219.

At Step S305, the height estimating section 215 calculates the height $^{Car}Z_C$ of the installed camera using Formula (12).

At Step S306, the height estimating section 215 outputs the obtained height $^{Car}Z_C$ of the installed camera.

<<Relative Position Estimation Procedure>>

Figure 11:
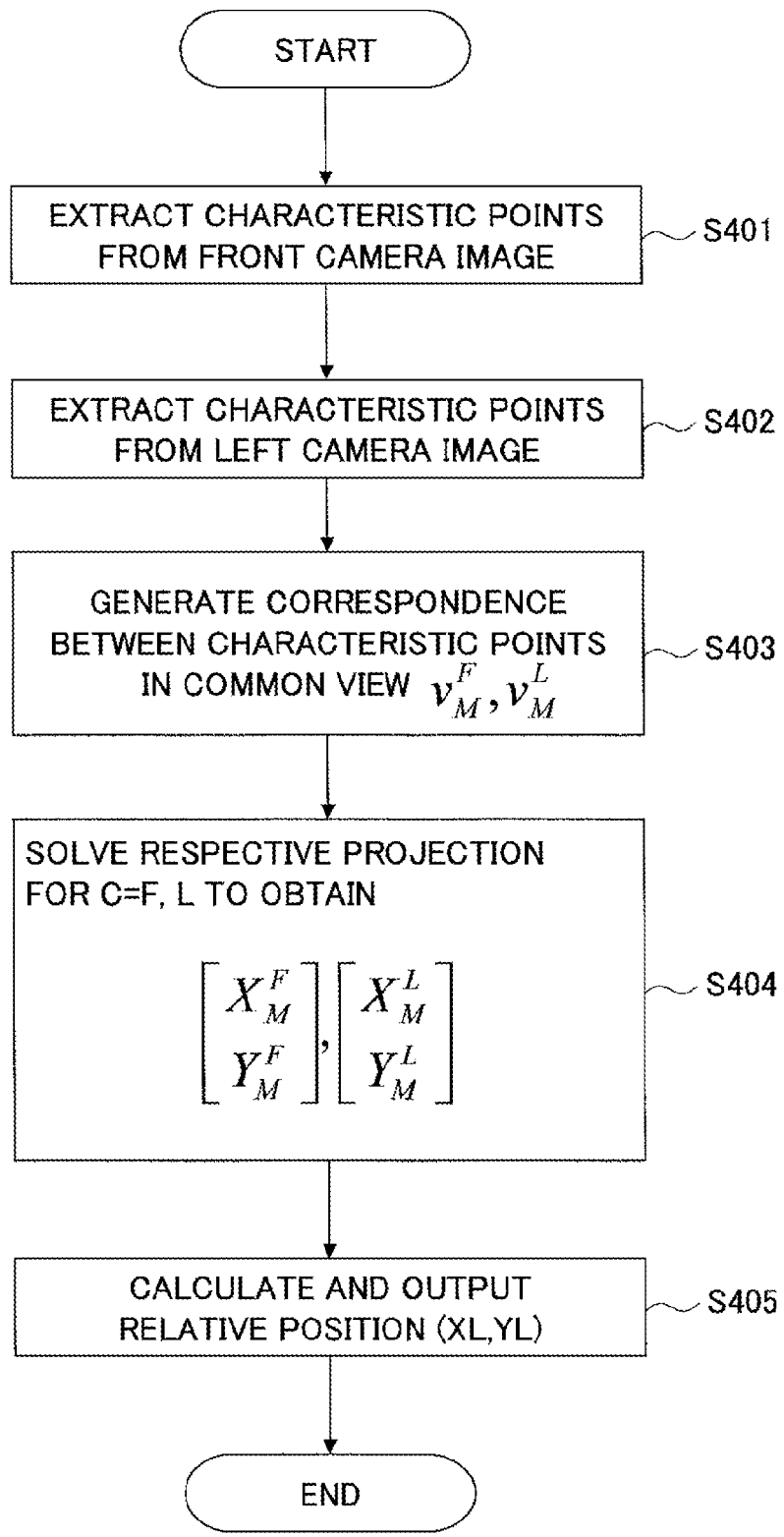
FIG. 11 is a flowchart illustrating an example of calculation of relative positions of cameras according to an embodiment.

FIG. 11 is a flowchart illustrating an example of calculation of relative positions of cameras according to the present embodiment. In the procedure illustrated in FIG. 11, a relative position of the left camera is obtained relative to the front camera as a reference. Relative positions of other cameras at right or back can be obtained similarly relative to the front camera.

At Step S401 illustrated in FIG. 11, the projective transform section 221 extracts a characteristic point in an image captured by the front camera.

At Step S402, the projective transform section 221 extracts a characteristic point in an image captured by the left camera.

At Step S403, the projective transform section 221 generates a correspondence between the characteristic points in common views of the front and left cameras, which is referred to as $v^F_M$ and $v^L_M$, respectively.

At Step S404, the projective transform section 221 solves projections of the front and left cameras, respectively, by Formula (13).

At Step S405, the relative position estimating section 223 calculates and outputs the relative position (XL, YL) of the left camera relative to the position of the front camera as a reference by Formula (15).

As above, according to the embodiments, it is possible to execute calibration without requiring special markers and environment. According to the embodiments, it is possible to execute calibration while driving a vehicle or making a small forward movement (or backward movement).

For example, according to the embodiments of calibration for an on-board multi-camera system, calibration can be done easily within a short time, and moreover, no markers are required so that calibration can be done while a user is driving the vehicle.

Strict placement of markers is not required according to the embodiment because markers are not required, or even if using markers. According to the embodiments, a procedure for obtaining a relative place relationship between the cameras is required in an on-board multi-camera system because installed positions of markers are not available to use them as references positions.

For example, a technology disclosed in Patent Document 1 estimates relative positions (translation) and relative orientations (rotation angles) between the cameras with which markers in common views are overlapped between the cameras. However, it is difficult to estimate the translation and rotation at the same time.

This is because numerous combinations of translation and rotation angles may exist with which markers are overlapped between cameras, for example, if markers are circular-shaped, which is viewed as the same circular shape in any directions.

Thereupon, an on-board multi-camera system according to the embodiments estimates only the relative positions (translation) when estimating a relative place relationship between cameras. Moreover, according to the embodiment, it is possible to estimate the positions faster with high precision because estimation can be done only with translation, which requires one less estimation parameter than the parameters required by the technology in Patent Document 1.

Modified Example

It is noted that it is possible to have a computer execute image processing including calibration described in the above embodiments by recording a program implementing the image processing including calibration according to the above embodiments in a recording medium.

For example, it is possible to implement the above image processing by recording the program on a recording medium and having an on-board computer read the recording medium on which the program is recorded.

Here, various types of recording media can be used including a recording medium that records information optically, electrically, or magnetically such as a CD-ROM, a flexible disk, an optical magnetic disk and the like, and a semiconductor memory and the like that records information electrically such as a ROM, a flash memory, and the like. Also, such recording media do not include a transitory medium such as a transmitting wave.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus comprising:
   an image obtaining section configured to obtain a plurality of images from a plurality of cameras installed on a moving object;
   a correspondence processing section configured to generate a correspondence between a plurality of characteristic points extracted from one of the images before a movement and another one of the images after the movement, the movement being a straight movement made by the moving object;
   a height/orientation estimating section configured to estimate an orientation and a height for each of the cameras, the estimation being executed by estimating a homography matrix from the corresponded characteristic points, decomposing the homography matrix, and using the decomposition result, a movement direction vector common to all the cameras, a road surface normal vector, and a moved amount of the moving object;
   a projective transform section configured to apply projective transform to common view parts between the cameras using the orientation and height for each of the cameras; and
   a relative position estimating section configured to estimate a relative position of one of the cameras relative to another one of the cameras using translation for overlapping the common view parts having the projective transform applied.

2. The image processing apparatus as claimed in claim 1, wherein the height/orientation estimating section includes a homography estimation/decomposition section configured to select a solution among two solutions obtained from the decomposition result of the homography matrix, the selected solution having a smaller difference with a unit matrix than the other solution, the homography matrix being estimated from the corresponded characteristic points;

an orientation estimating section configured to calculate a rotation matrix by giving the movement direction vector and the road surface normal vector to the selected solution; and a height estimating section configured to estimate the height using the selected solution and the moved amount.

3. The image processing apparatus as claimed in claim 1, further comprising:

a determination section configured to determine whether the moving object is making a straight movement, wherein if the determination section determines that the moving object is making the straight movement, the image processing apparatus has the correspondence processing section, the height/orientation estimating section, the projective transform section, and the relative position estimating section operate.

4. The image processing apparatus as claimed in claim 1, further comprising:

a characteristic point extracting section configured to extract the characteristic points from the images capturing a road surface.

5. An image processing method comprising:

obtaining a plurality of images from a plurality of cameras installed on a moving object;

generating a correspondence between a plurality of characteristic points extracted from one of the images before a movement and another one of the images after the movement, the movement being a straight movement made by the moving object;

estimating an orientation and a height for each of the cameras, the estimation being executed by estimating a homography matrix from the corresponded characteristic points, decomposing the homography matrix, and using the decomposition result, a movement direction vector common to all the cameras, a road surface normal vector, and a moved amount of the moving object;

applying projective transform to common view parts among the cameras using the orientation and the height for each of the cameras; and estimating a relative position of one of the cameras relative to another one of the cameras using translation for overlapping the common view parts having the projective transform applied.

6. A non-transitory computer-readable recording medium having a program stored therein for causing a computer to execute an image processing method, the method comprising:

obtaining a plurality of images from a plurality of cameras installed on a moving object;

generating a correspondence between a plurality of characteristic points extracted from one of the images before a movement and another one of the images after the movement, the movement being a straight movement made by the moving object;

estimating an orientation and a height for each of the cameras, the estimation being executed by estimating a homography matrix from the corresponded characteristic points, decomposing the homography matrix, and using the decomposition result, a movement direction vector common to all the cameras, a road surface normal vector, and a moved amount of the moving object;

applying projective transform to common view parts among the cameras using the orientation and the height for each of the cameras; and estimating a relative position of one of the cameras relative to another one of the cameras using translation for overlapping the common view parts having the projective transform applied.

* * * * *